United States Patent
Qu et al.

(10) Patent No.: US 12,309,750 B2
(45) Date of Patent: May 20, 2025

(54) FEEDBACK METHOD AND APPARATUS

(71) Applicant: BEIJING UNISOC COMMUNICATIONS TECHNOLOGY CO., LTD., Beijing (CN)

(72) Inventors: Xin Qu, Beijing (CN); Jinyu Zhang, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 464 days.

(21) Appl. No.: 17/709,148

(22) Filed: Mar. 30, 2022

(65) Prior Publication Data

US 2022/0225307 A1 Jul. 14, 2022

Related U.S. Application Data

(63) Continuation of application No. PCT/CN2020/116761, filed on Sep. 22, 2020.

(30) Foreign Application Priority Data

Sep. 30, 2019 (CN) .................. 201910944385.X

(51) Int. Cl.
*H04L 5/00* (2006.01)
*H04W 72/044* (2023.01)
*H04W 72/20* (2023.01)

(52) U.S. Cl.
CPC ......... *H04W 72/044* (2013.01); *H04L 5/0055* (2013.01); *H04W 72/20* (2023.01)

(58) Field of Classification Search
CPC ..... H04W 72/044; H04W 72/02; H04W 4/40; H04W 72/0446; H04W 4/20; H04W 4/44;
(Continued)

(56) References Cited

U.S. PATENT DOCUMENTS

2004/0100896 A1* 5/2004 Vayanos ............... H04L 1/0009 375/222
2019/0387377 A1* 12/2019 Zhang ................. H04W 52/383
(Continued)

FOREIGN PATENT DOCUMENTS

CN 107197528 A 9/2017
CN 107566096 A 1/2018
(Continued)

OTHER PUBLICATIONS

International Search Report for PCT/CN2020/116761 mailed Dec. 28, 2020.
(Continued)

*Primary Examiner* — Christopher R Crompton
(74) *Attorney, Agent, or Firm* — MASCHOFF BRENNAN; Paul G. Johnson

(57) ABSTRACT

Embodiments of the present disclosure provides a feedback method and apparatus, SCI sent by a second UE to a first UE is used to indicate N time-frequency resources, the second UE sends a PSSCH to the first UE on each of the N time-frequency resources, the N PSSCHs correspond to the same TB, the first UE determines L time-frequency resources according to the N time-frequency resources indicated by the first SCI, and time domains of PSFCH resources respectively corresponding to the L time-frequency resources are the same. Afterwards, the first UE feeds back to the second UE according to the PSFCH resource and received PSSCH.

18 Claims, 10 Drawing Sheets

(58) Field of Classification Search
CPC ...... H04W 4/46; H04W 72/20; H04L 5/0055; H04L 1/16; H04L 5/0005; H04L 1/18123–1819; H05L 5/0055
USPC .......................................................... 370/330
See application file for complete search history.

(56) References Cited

U.S. PATENT DOCUMENTS

| | | | | |
|---|---|---|---|---|
| 2022/0078782 | A1* | 3/2022 | Zhao | H04W 72/0446 |
| 2022/0191847 | A1* | 6/2022 | Hong | H04W 72/25 |
| 2022/0321306 | A1* | 10/2022 | Wang | H04L 1/1864 |

FOREIGN PATENT DOCUMENTS

| | | |
|---|---|---|
| CN | 108631968 A | 10/2018 |
| CN | 109691146 A | 4/2019 |
| CN | 109792594 A | 5/2019 |
| WO | 2019151915 A1 | 8/2019 |

OTHER PUBLICATIONS

The first Office Action issued by the China National Intellectual Property Administration (CNIPA) dated Oct. 9, 2021 for the Chinese Patent Application No. 201910944385.X.

Asustek, Discussion on sidelink physical layer procedure on NR V2X, 3GPP TSG RAN WG1 #98bis, R1-1911023, Chongqing, China, Oct. 14-20, 2019.

LG Electronics, Discussion on physical layer structure for NR sidelink, 3GPP TSG RAN WG1 #97, R1-1907012, Reno, USA, May 13-17, 2019.

Samsung, On Sidelink HARQ Procedure, 3GPP TSG RAN WG1 #97, R1-1906948, Reno, USA, May 13-17, 2019.

* cited by examiner

FEEDBACK METHOD AND APPARATUS

CROSS-REFERENCE TO RELATED APPLICATION

This application is a continuation of International Application No. PCT/CN2020/116761, field on Sep. 22, 2020, which claims priority to Chinese patent application No. 201910944385.X, filed on Sep. 30, 2019, both of the above applications are incorporated by reference herein.

TECHNICAL FIELD

Embodiments of the present disclosure relate to the field of communication technologies and, in particular, to a feedback method and apparatus.

BACKGROUND

With the development of the 3rd Generation Partnership Project (3GPP), new radio (NR) introduces vehicle-to-everything (V2X) technology, upon which vehicles can communicate directly with everything, such as user equipment (UE), roadside unit, etc., through a PC5 interface. The V2X technology is a key technical direction of the Release 16 (R16) of long term evolution (LTE).

In V2X communication, when sending service data, a transmitter UE (Tx UE) sends physical sidelink control channel (PSCCH) to a receiver UE (Rx UE), and the PSCCH carries sidelink control information (SCI) which may also be referred to as direct link control information or single-side link control information. The SCI may contain time-frequency resource indication information of the Tx UE for N times of data transmission of the same transport block (TB). Based on the SCI, the Tx UE may instruct time-frequency resource occupied for sending a physical sidelink shared channel (PSSCH) for N times to the Rx UE, and the N times of transmission correspond to the same TB. After the Rx UE receives the PSCCH, the time-frequency resource for the Tx UE to send the PSSCH for N times can be determined according to the time-frequency resource information contained in the SCI in the PSCCH, and the PSSCH sent by the Tx UE on the corresponding time-frequency resource can be received. In order to improve the accuracy of data transmission, V2X communication also introduces a feedback mechanism for unicast or groupcast. At this point, the Rx UE is required to determine appropriate feedback resource, which is hereinafter referred to as physical sidelink feedback channel (PSFCH) resource, or physical direct link feedback channel resource, or physical single-side link feedback channel resource.

SUMMARY

In a first aspect, an embodiment of the present disclosure provides a feedback method, including:

receiving, by a first user equipment (UE), first sidelink control information (SCI) from a second UE through a sidelink, where the first SCI is used to indicate N time-frequency resources, each of the N time-frequency resources is used by the second UE to send a physical sidelink shared channel (PSSCH), the PSSCH on each of the N time-frequency resources corresponds to a same transport block (TB), $N \geq 2$, and N is an integer;

determining, by the first UE, L time-frequency resources according to the N time-frequency resources, where time domains of physical sidelink feedback channel (PSFCH) resources corresponding to different time-frequency resources in the L time-frequency resources are the same; and feeding back, by the first UE, to the second UE according to a PSFCH resource and received PSSCH.

In a second aspect, an embodiment of the present disclosure provides a feedback apparatus, including:

a transceiving unit, configured to receive first sidelink control information (SCI) from a second UE through a sidelink, where the first SCI is used to indicate N time-frequency resources, each of the N time-frequency resources is used by the second UE to send a physical sidelink shared channel (PSSCH), the PSSCH on each of the N time-frequency resources corresponds to a same transport block (TB), $N \geq 2$, and N is an integer; and a processing unit, configured to determine L time-frequency resources according to the N time-frequency resources, where time domains of physical sidelink feedback channel (PSFCH) resources corresponding to different time-frequency resources in the L time-frequency resources are the same; and feed back to the second UE according to a PSFCH resource and received PSSCH.

In a third aspect, an embodiment of the present disclosure provides a user equipment, including a processor, a memory, and a computer program stored in the memory and executable on the processor, and when the processor executes the program, the method according to various possible implementations of the first aspect or to the first aspect as such is implemented.

In a fourth aspect, an embodiment of the present disclosure provides a computer program product including instructions which, when running on a UE, cause the computer of the UE to perform the method according to various possible implementations of the first aspect or to the first aspect as such.

In a fifth aspect, an embodiment of the present disclosure provides a storage medium having stored therein instructions which, when running on a UE, cause the UE to perform the method according to various possible implementations of the first aspect or to the first aspect as such.

BRIEF DESCRIPTION OF THE DRAWINGS

In order to more clearly illustrate the technical solutions in the embodiments of the present disclosure or in the prior art, the following will briefly introduce the accompanying drawings required in the description of the embodiments or of the prior art. Obviously, the accompanying drawings in the following description are some embodiments of the present disclosure. For those of ordinary skill in the art, other drawings can be further obtained based on these drawings without creative effort.

DESCRIPTION OF EMBODIMENTS

Figure 1:
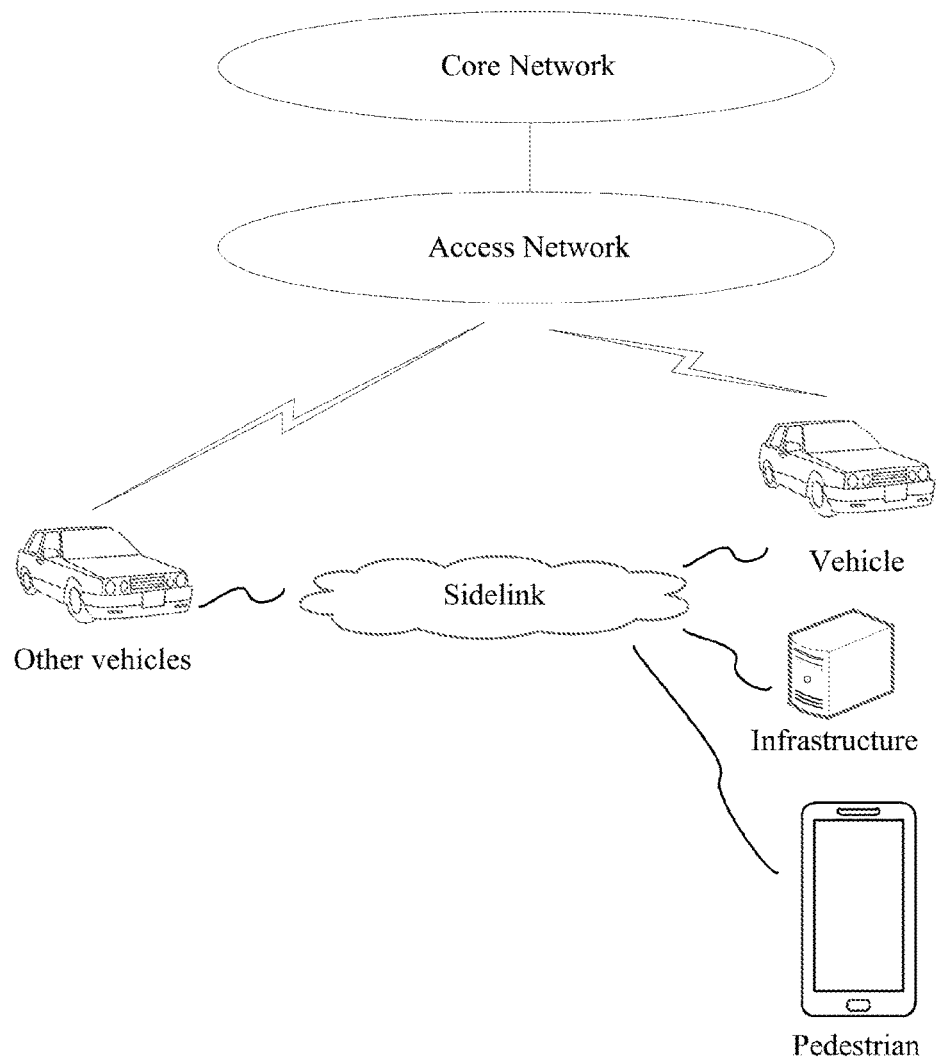
FIG. 1 is a schematic diagram of a network architecture to which a feedback method provided by an embodiment of the present disclosure is applicable.

In order to make the purpose, technical solutions and advantages of the embodiments of the present disclosure clearer, the technical solutions in the embodiments of the present disclosure will be clearly and completely described below in conjunction with the accompanying drawings in the embodiments of the present disclosure. Apparently, the described embodiments are a part of the embodiments of the present disclosure, rather than all of the embodiments. Based on the embodiments in the present disclosure, all other embodiments obtained by those of ordinary skill in the art without creative effort shall fall within the scope of protection of the present disclosure.

In the direct communication technology, two UEs perform direct communication through a PC5 interface, and the direct communication can also be called sidelink communication. Among the two UEs, the one sends data is called a transmitter (Tx) UE, and the one that receives data is called a receiver (Rx) UE. In the process of the direct communication, there are two methods of resource allocation, and the first one is a method of scheduled resource allocation. In this method, the Tx UE is in a radio resource control (RRC) connection state, and is configured by the base station through dedicated signaling to be used for time-frequency resources for the direct communication; and another one is the method of automatic resource selection. In this method, the base station can pre-configure or real-time configure the UE with a transmission resource pool for direct communication through a system message or radio resource control (RRC) signaling, the Tx UE can be in any state, such as a RRC connection state, a RRC idle state or a RRC inactive state, and the Tx UE selects resources for the direct communication from the transmission resource pool. When the Tx UE is covered by the network, the Tx UE can obtain resources by using the above first method or the above second method. When the Tx UE is not covered by the network, the Tx UE obtains resources by using the above second method, that is, the Tx UE uses the method of automatic resource selection to select the resources for the direct communication from the preconfigured transmission resource pool. The case where the Tx UE is not covered by the network means that the Tx UE cannot detect a cell on a frequency where the direct communication service is carried out, or a scenario where signal strength of a cell detected is lower than a preset threshold, and the direct communication service is, for example, V2X or the like.

The above automatic resource selection method also supports a blind retransmission mechanism and a hybrid automatic repeat request (HARQ) mechanism. In order to further improve the reliability of resource allocation in the method of automatic resource selection, the transmission based on blind retransmission and transmission based on the HARQ is proposed in the 3GPP to support the resource reservation mechanism, that is, the Tx UE sends the PSCCH to the Rx UE, the SCI carried by the PSCCH indicates N time-frequency resources, that is, in addition to indicating the time-frequency resources of the PSSCH scheduled by the current PSCCH, an SCI also indicates the time-frequency resources of the PSSCH scheduled by the subsequent (N−1) PSCCH, where the PSSCH scheduled respectively by the N PSCCHs corresponds to the same TB.

In addition, an important application of direct communication is the V2X communication, which supports three data transmission methods: unicast, groupcast and broadcast, where the unicast and groupcast support HARQ feedback. During a unicast process, if the Rx UE decodes the received PSSCH correctly, it sends an acknowledgement (ACK) to the Tx UE; when the decoding is incorrect, a negativeAC-Knowledgement (NACK) is fed back. Groupcast supports two feedback methods. In a first feedback method, if the Rx UE decodes correctly, no feedback is sent; and if the Rx UE decodes incorrectly, NACK is sent to the Tx UE, and each Rx UE in the groupcast group uses the same PSFCH resource to send feedback in a superimposed manner. In the second feedback method, if the Rx UE decodes correctly, ACK is sent to the Tx UE; and if the Rx UE decodes incorrectly, NACK is sent to the Tx UE, and each Rx UE in a groupcast group respectively uses independent PSFCH resources to send ACK or NACK to the Tx UE.

In order to save the overhead of feedback information, it is determined in the 3GPP that the feedback resource in a transmission resource pool is configured while configuring or preconfiguring such transmission resource pool. For example, each sidelink time slot is pre-configured to include the PSFCH resource; for another example, the last one in every two sidelink time slots is pre-configured to include the PSFCH resource; and for yet another example, the last one in every four sidelink time slots is pre-configured to include the PSFCH resource. The sidelink time slot refers to each time slot in the sidelink resource pool.

The above shows that when the SCI is used to indicate the time-frequency resources of N times of data transmission for the same TB, the Tx UE may send the PSSCH in each of N different time slots. However, not every slot contains the PSFCH resource, so that N times of PSSCH transmission corresponding to the same TB will be fed back on the PSFCH resources with the same time domain. At this point, there is no appropriate solution in the industry to solve the problem that how the Rx UE feeds back to the Tx UE whether the TB is correctly received.

In view of this, an embodiment of the present disclosure provide a feedback method, in which, when SCI indicates time-frequency resource for N times of data transmission for the same TB, a Rx UE determines L time-frequency resources according to N time-frequency resources, and time domains of the PSFCH resources corresponding to each of the L time-frequency resources are the same. Feedback on the PSFCH resource to a Tx UE improves the transmission reliability. And the present disclosure can also reduce the number of PSFCHs sent at the same time and reduce PSFCH collisions.

First, names involved in the embodiments of the present disclosure are explained.

First UE, also referred to as a receiver (Rx) UE, is configured to receive the PSSCH sent by the second UE through the sidelink between the first UE and the second UE, determine whether the received PSSCH data can be correctly decoded, determine the feedback resource, and then send the feedback information to the second UE by using the feedback resource.

Second UE, also referred to as a transmitter (Tx) UE, is configured to send data to the first UE through the sidelink between the first UE and the second UE, and receive the feedback information sent by the first UE through the direct link.

Feedback resource, namely the PSFCH resource, is used by the Rx UE to send the feedback information.

It should be noted that, in the embodiments of the present disclosure, the first UE and the second UE are relative, not absolute. For example, when UE1 is the transmitter UE and UE2 is the receiver UE, the first UE is UE2 and the second UE is UE1; and when UE1 is the receiver UE and UE2 is the transmitter UE, the first UE is UE1 and the second UE is UE2.

Next, the network architecture of the feedback method provided by an embodiment of the present disclosure is illustrated by an example. Exemplarily, please refer to FIG. 1.

FIG. 1 is a schematic diagram of a network architecture to which a feedback method provided by an embodiment of the present disclosure is applicable. Referring to FIG. 1, the network architecture may include: a core network, an access network, and a user equipment. The core network includes several core network devices, of which the functions are mainly to provide user connection, manage users, and carry out services, etc., and provide an interface to an external network as a bearer network. For example, the core network of the LTE system may include devices such as a mobility management entity (MME), and a serving gateway (S-GW). The core network of the new radio (NR) system may include devices such as an access and mobility management function (AMF) entity, a user plane function (UPF) entity and a session management function (SMF) entity.

The access network includes several access network devices which communicate with the core network devices through an interface technology. The access network device may be a base station (BS) which may include various forms of macro base stations, micro base stations, relay stations, access points, etc. In systems using different radio access technologies, a name of a device—capable of base station function may vary, for example, in the LTE system, it is called eNodeB or eNB; while in the 5G NR system, it is called gNodeB or gNB.

UE may include various wireless communication capable handheld devices, on-board devices, wearable devices, computing devices, or other processing devices connected to a wireless modem. For ease of description, the devices mentioned above are all referred to as user equipment.

In the embodiments of the present disclosure, UE includes: a vehicle, other vehicles, infrastructure, pedestrian, and the like. In the following embodiments, the vehicles, the infrastructure or the pedestrian are referred to as the first UE and the other vehicles are referred to as the second UE for illustration, but the two can also interchange roles, which is not limited. In addition, in FIG. 1, both the first UE and the second UE may be covered by the access network device; or the first UE is not covered by the network device, and the second UE is covered by the network device; or the first UE is covered by the network device, and the second UE is not covered by the network device.

Figure 2:
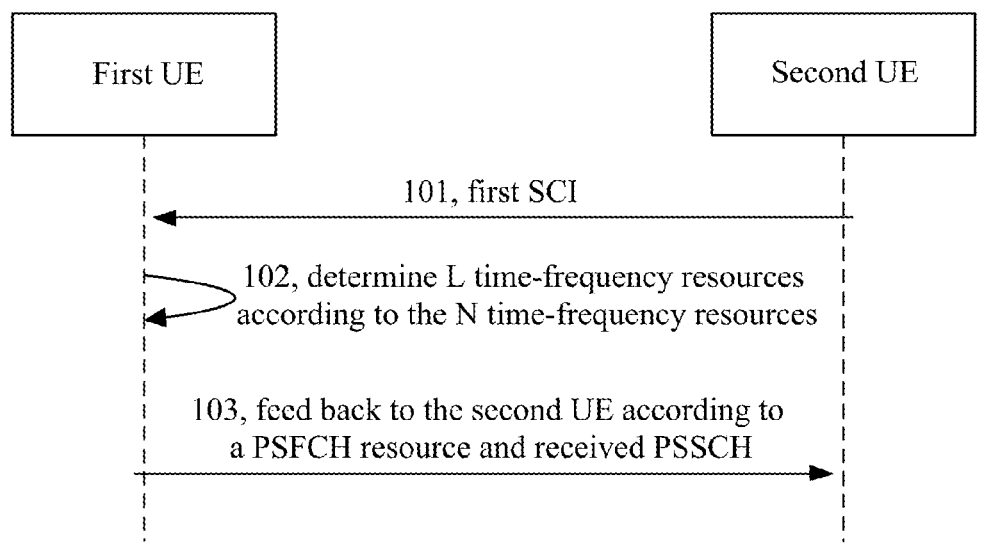
FIG. 2 is a flowchart of a feedback method provided by an embodiment of the present disclosure.

Hereinafter, the feedback method according to the embodiments of the present disclosure will be described in detail based on the above explanation of terms and the network architecture shown in FIG. 1. Exemplarily, please refer to FIG. 2. FIG. 2 is a flowchart of a feedback method provided by an embodiment of the present disclosure. This embodiment includes the following.

101, a first user equipment (UE) receives first sidelink control information (SCI) from a second UE through a sidelink.

The first SCI is used to indicate N time-frequency resources, each of the N time-frequency resources is used by the second UE to send a physical sidelink shared channel (PSSCH), the PSSCH on each of the N time-frequency resources corresponds to a same TB, N≥2 and N is an integer. The N time-frequency resources may be, in the time domain, continuous sidelink time slots or discontinuous sidelink time slots. For example, if N=2 and the second UE sends the PSSCH on two continuous sidelink time slots, when the second UE sends the PSCCH on the first of the two slots, namely on a slot n, the PSCCH contains one SCI, where the SCI indicates two time-frequency resources, which are respectively located in the slot n and a slot (n+1); for another example, if N=3 and the second UE sends the PSSCH on every sidelink time slot, when the second UE sends the PSCCH on the first slot of the three time slots, namely on the slot n, the PSCCH contains one SCI, where the SCI indicates three time-frequency resources, which are respectively located in the slot n, a slot (n+2), and a slot (n+4).

102, the first UE determines L time-frequency resources according to the N time-frequency resources.

The time domains of the PSFCH resources corresponding to different time-frequency resources in the L time-frequency resources are the same.

In order to save feedback information overhead in the 3GPP, it is possible that only one of the M time slots contains the PSFCH resource. At this point, the PSFCH resource can feed back the PSSCH received in M time slots at most. When one SCI indicates N time-frequency resources for sending the PSSCH, the N time-frequency resources may be located in N continuous sidelink time slots, or on N discontinuous sidelink time slots. Moreover, in the case M≥2, only some of the N time slots have the PSFCH resource. At this point, it is necessary to determine the L time-frequency resources according to both the N time-frequency resources and the time slots containing the PSFCH resources in the N time slots, and the time domains of the PSFCH resources respectively corresponding to different time-frequency resources in the L time-frequency resources are the same. Exemplarily, please refer to FIG. 3 and FIG. 4.

Figure 3:
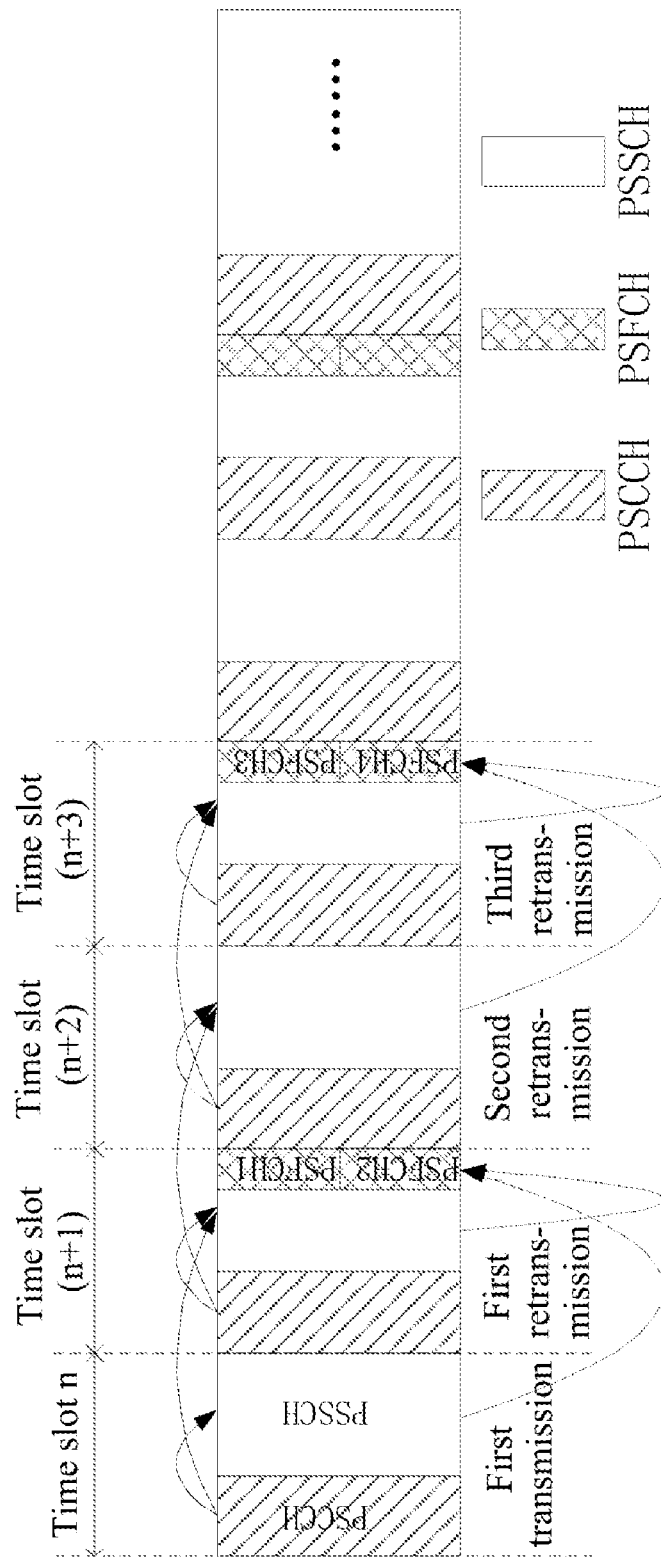
FIG. 3 is a corresponding relationship diagram between time-frequency resources and PSFCH resources in a feedback method provided by an embodiment of the present disclosure.

FIG. 3 is a corresponding relationship diagram between time-frequency resources and PSFCH resources in a feedback method provided by an embodiment of the present disclosure. Please refer to FIG. 3, N=2, K=0 and only the last one in every two (i.e., M=2) sidelink time slots contains the PSFCH resource. At this point, L=2, as shown by the solid arrows in the figure, and the SCI in the PSCCH in time slot n, in addition to indicating the time-frequency resource of the PSSCH in time slot n, also indicates the time-frequency resource of the PSSCH in time slot (n+1); similarly, the SCI in the PSCCH in time slot (n+1), in addition to indicating the time-frequency resource of the PSSCH in time slot (n+1), also indicates the time-frequency resource of the PSSCH in time slot (n+2) . . . ; as shown by the dotted arrows in the figure, in time slot n and time slot (n+1), only time slot (n+1) contains the PSFCH resource, so the PSSCH in time slot n is fed back by the PSFCH1 in time slot (n+1), and the PSSCH in time slot (n+1) is fed back by the PSFCH2 in time slot (n+1), where the PSFCH1 and PSFCH2 have the same time domain and different frequency domains.

Figure 4:
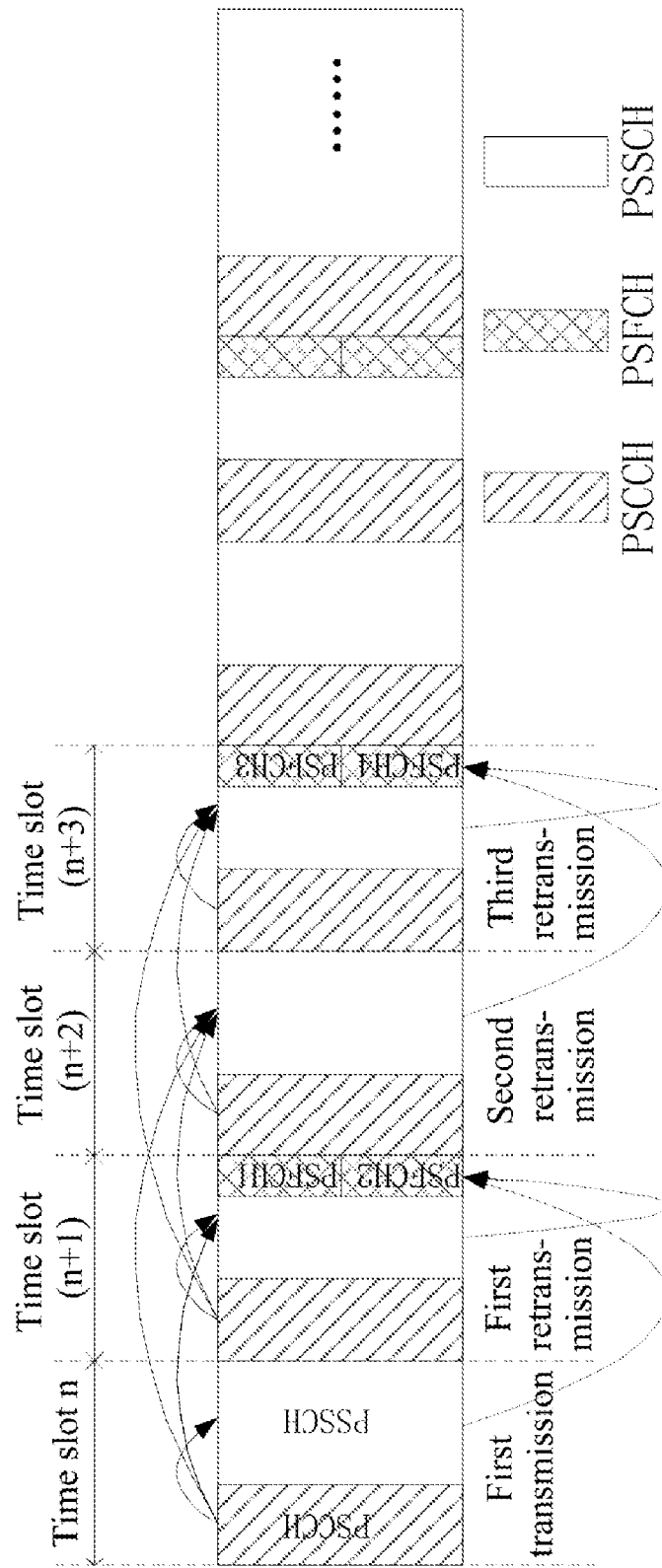
FIG. 4 is a corresponding relationship diagram between time-frequency resources and PSFCH resources in a feedback method provided by an embodiment of the present disclosure.

FIG. 4 is a corresponding relationship diagram between time-frequency resources and PSFCH resources in a feedback method provided by an embodiment of the present disclosure. Please refer to FIG. 4, N=3, K=0 and only the last one in every two (i.e., M=2) sidelink time slots contains the PSFCH resource. At this point, L=2, as shown by the solid arrows in the figure, and the SCI in the PSCCH in time slot n, in addition to indicating the time-frequency resource of the PSSCH in time slot n, also indicates both the time-frequency resource of the PSSCH in time slot (n+1) and the time-frequency resource of the PSSCH in time slot (n+2); similarly, the SCI in the PSCCH in time slot (n+1), in addition to indicating the time-frequency resource of the PSSCH in time slot (n+1), also indicates both the time-frequency resource of the PSSCH in time slot (n+2) and the time-frequency resource of the PSSCH in time slot (n+3) . . . ; as shown by the dotted arrows in the figure, in time slot n and time slot (n+1), only time slot (n+1) contains the PSFCH resource, so the PSSCH in time slot n is fed back by the PSFCH1 in time slot (n+1), and the PSSCH in time slot (n+1) is fed back by the PSFCH2 in time slot (n+1), where the PSFCH1 and PSFCH2 have the same time domain and different frequency domains.

In the above embodiment, the PSFCH1 and PSFCH2 have the same time domain and different frequency domains. However, the embodiments of the present disclosure are not limited thereto. In other feasible implementations, the PSFCH1 and PSFCH2 may also have the same time domain, same frequency domain, and different code domains.

103, the first UE feeds back to the second UE according to a PSFCH resource and received PSSCH.

Exemplarily, after determining the L time-frequency resources, the first UE feeds back to the second UE according to the PSFCH resources respectively corresponding to different time-frequency resources in the L time-frequency resources and the received PSSCH. For example, if it is received correctly, ACK is fed back, and if it is not received correctly, NACK is fed back; for another example, if it is received correctly, no feedback is given, and if it is not received correctly, NACK is fed back.

In the feedback method provided in this embodiment, the first SCI sent by the second UE to the first UE indicates N time-frequency resources, the second UE sends the PSSCH to the first UE on each of the N time-frequency resources, the N PSSCHs correspond to the same TB, the first UE determines L time-frequency resources according to the N time-frequency resources indicated by the first SCI, and time domains of PSFCH resources respectively corresponding to the L time-frequency resources are the same. Afterwards, the first UE feeds back to the second UE according to the PSFCH resource and received PSSCH. By using the solution, when the first SCI indicates the time-frequency resources for N times of data transmission for the same TB, the Rx UE determines the L time-frequency resources according to the N time-frequency resources, and the time domains of the PSFCH resources corresponding to each of the L time-frequency resources are the same. After that, feedback is sent to the Tx UE on the PSFCH resources with the same time domain, which improves the transmission reliability.

How the first UE determines the L time-frequency resources according to the N time-frequency resources will be described in detail below.

In a feasible implementation, when the first UE determines the L time-frequency resources according to the N time-frequency resources, for each of the N time-frequency resources, the first UE determines a first time slot according to a time domain position of the time-frequency resource and a preconfigured time slot difference value K, so as to obtain N first time slots, where the time slot difference value K is used to indicate a minimum time domain interval between a time slot where the first UE receives the PSSCH sent by the second UE and a time slot where the first UE sends the PSFCH corresponding to the PSSCH. After that, the first UE determines the L first time slots from the N first time slots, where the L first time slots are continuous sidelink time slots; or the L first time slots are discontinuous sidelink time slots, and there is no PSFCH resource on an interval time slot between any two first time slots in the L first time slots. At last, the first UE determines the L time-frequency resources according to the L first time slots.

Exemplarily, considering the processing delay of the first UE, if the first UE receives the PSSCH from the second UE in time slot n, it takes a certain processing time to decode the received PSSCH to determine whether the PSSCH is received correctly, and the PSFCH resource is used for feedback in a certain time slot after the time slot n, such as time slot (n+K). The value of K depends on the minimum processing delay of all UEs supporting V2X services, etc. Therefore, the first UE may, for each of the N time-frequency resources, determine one first time slot, thereby obtaining the N first time slots. In addition, not every time slot has the PSFCH resource, so that only some of the N first time slots have the PSFCH resources, and even there are no PSFCH resources in the N first time slots.

In the embodiment of the present disclosure, the above L first time slots are continuous sidelink time slots or discontinuous sidelink time slots. Only the last one of the L continuous or discontinuous sidelink time slots has the PSFCH resource; or, there is no PSFCH resource on each of the L continuous or discontinuous sidelink time slots. Exemplarily, please refer to FIG. 5 and FIG. 6.

Figure 5:
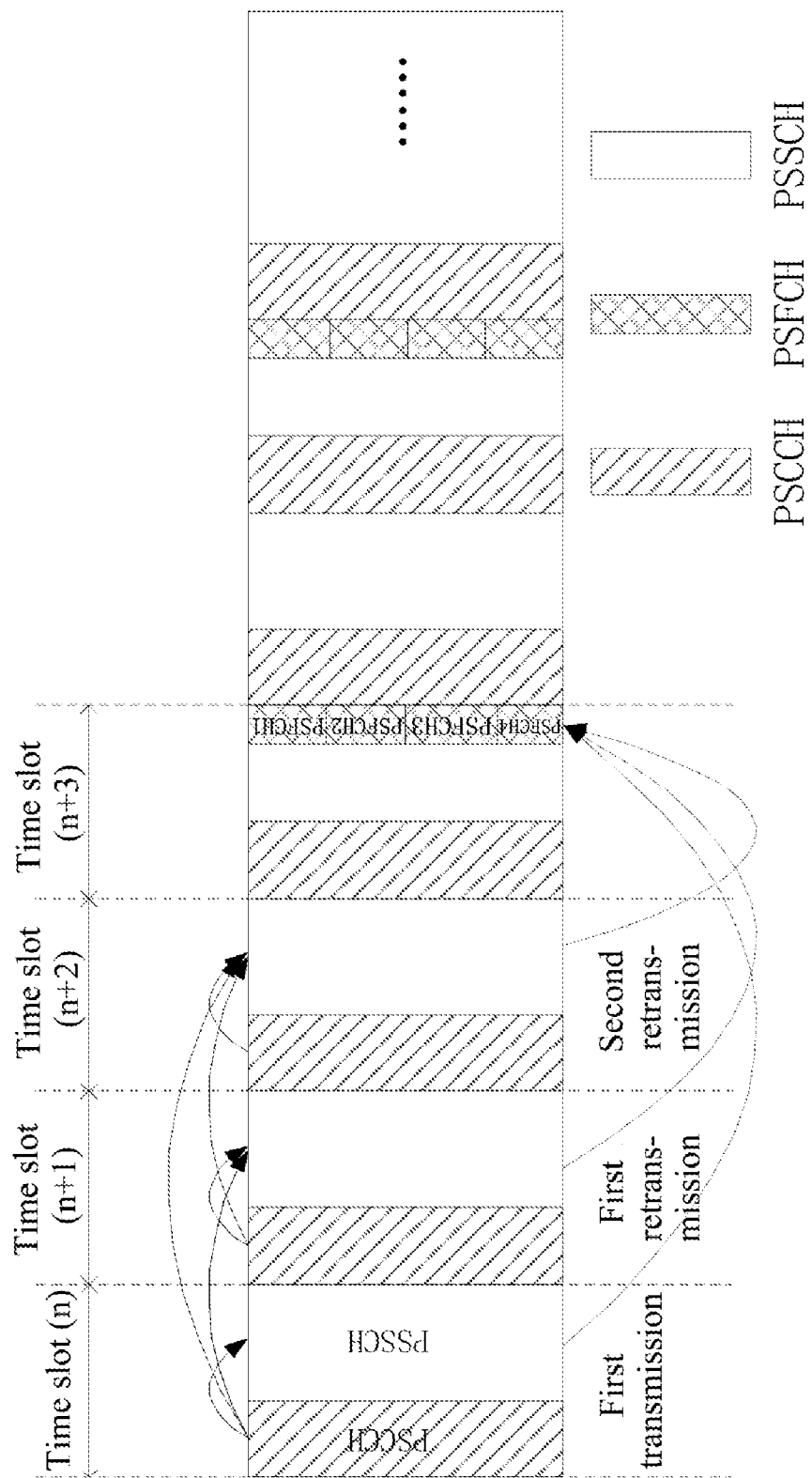
FIG. 5 is a corresponding relationship diagram between time-frequency resources and PSFCH resources in a feedback method provided by an embodiment of the present disclosure.

FIG. 5 is a corresponding relationship diagram between time-frequency resources and PSFCH resources in a feedback method provided by an embodiment of the present disclosure. Please refer to FIG. 5, N=3 and only the last one in every four sidelink time slots contains the PSFCH resource. When K=0, the first UE determines three first time slots according to both the three time-frequency resources indicated by the first SCI and the time slot K, that is, the time slot n, the time slot (n+1) and the time slot (n+2). The three first time slots are continuous, and none of them have the PSFCH resource therein. At this point, L=N=3, the time domain of PSFCH resources respectively corresponding to the time-frequency resources used to send PSSCH in time slot n, the time slot (n+1) and the time slot (n+2) are the same.

Figure 6:
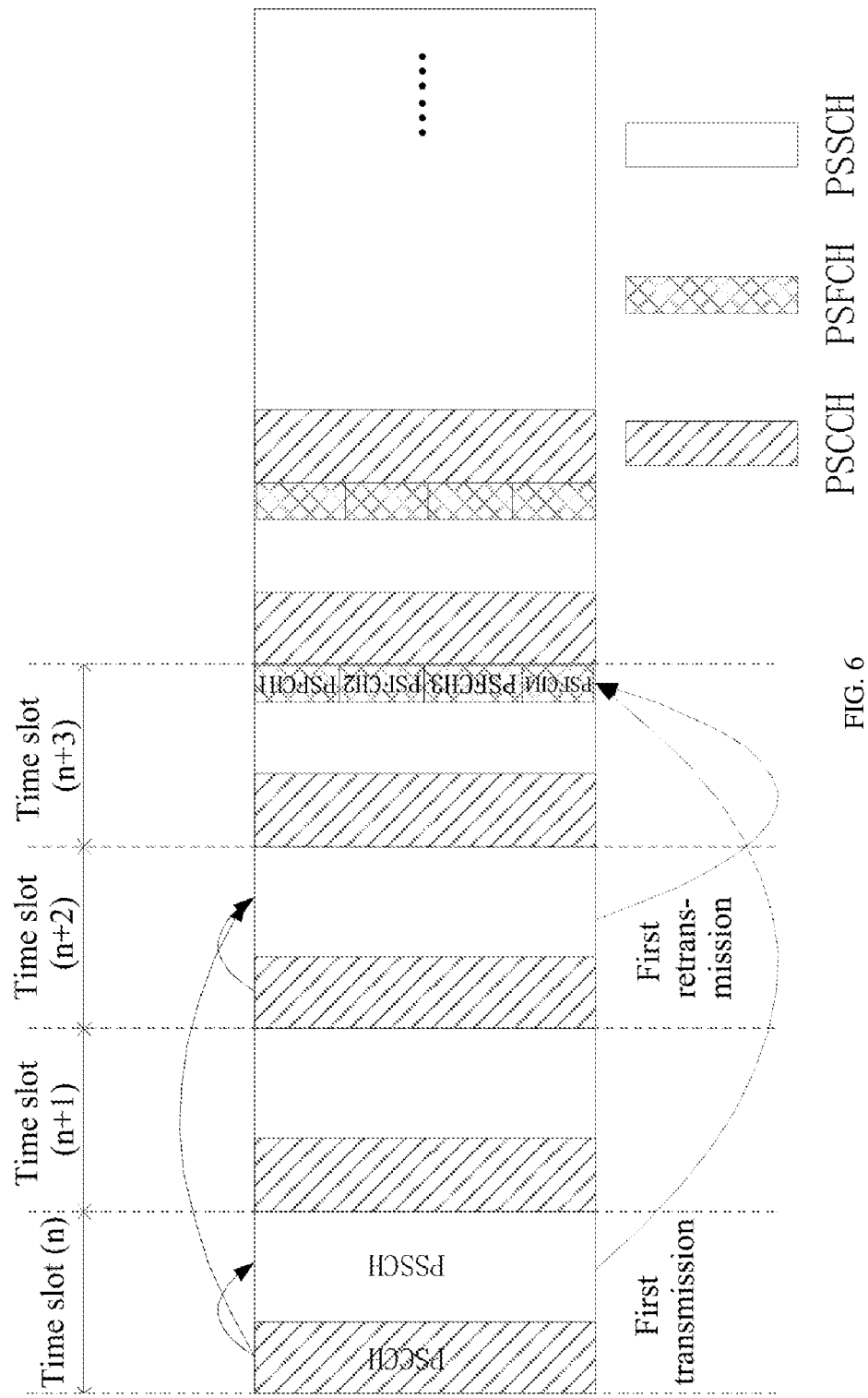
FIG. 6 is a corresponding relationship diagram between time-frequency resources and PSFCH resources in a feedback method provided by an embodiment of the present disclosure.

FIG. 6 is a corresponding relationship diagram between time-frequency resources and PSFCH resources in a feedback method provided by an embodiment of the present disclosure. Please refer to FIG. 6, N=2 and only the last one in every four sidelink time slots contains the PSFCH resource, and the two time-frequency resources indicated by the first SCI are located in time slot n and time slot (n+2), respectively. When K=0, the first UE determines two first time slots according to the two time-frequency resources indicated by the first SCI, that is, the time slot n and the time slot (n+2). The two first time slots are discontinuous, and there is no PSFCH resource in both the two first time slots and at the time interval between the two first time slots, where the interval time slot is time slot (n+1). At this point, L=N=2, and the time domains of the PSFCH resources respectively corresponding to the time-frequency resources used to send the PSSCH in time slot n and time slot (n+2) are the same. The PSFCH resources are located in time slot (n+3).

In the above embodiment, if only the last one of the L first time slots has the PSFCH resource therein, the first UE feeds back according to the PSFCH resource; otherwise, the first UE is required to determine the PSFCH resource according to the L time-frequency resources. At this point, the first UE determines a second time slot according to the L first time slots, where the second time slot is located behind the last one of the L first time slots in the resource pool, closest to the last one of the L first time slots, and contains the slot of the PSFCH resource; and then the first UE determines the PSFCH resource according to the second time slot.

Exemplarily, please refer to FIG. 5; when L=N=3, the L first time slots include time slot n, time slot (n+1) and time slot (n+2), and the last first slot is slot (n+2); since there is no PSFCH resource on slot (n+2), the first UE determines that the time slot (n+3) is the closest to the time slot (n+2), so that the second time slot is the time slot (n+3), and the first UE determines the PSFCH resource according to the time slot (n+3). Please refer to FIG. 6, when L=N=2, the L first time slots include time slot n and time slot (n+2); since there is no PSFCH resource in slot (n+2), the first UE determines that the time slot (n+3) is the closest to the time slot (n+2), so that the second time slot is the time slot (n+3), and the first UE determines the PSFCH resource according to the time slot (n+3).

How the first UE feeds back to the second UE after determining the PSFCH resource in the above embodiment will be described in detail below.

The first method: the first UE sends feedback information to the second UE on each of the L PSFCH sub-resources.

In this method, the PSFCH resource at least includes L PSFCH sub-resources with the same time domain, and the L time-frequency resources respectively correspond to different PSFCH sub-resources in the L PSFCH sub-resources. When the first UE feeds back to the second UE according to the PSFCH resource and the received PSSCH, the first UE sends the feedback information to the second UE on each of the L PSFCH sub-resources.

When the time domains of the PSFCH resources respectively corresponding to the L time-frequency resources used to send the PSSCH are the same, the L PSFCH resources belong to the above M PSFCH sub-resources. For example, in FIG. 3, the time-frequency resources used to send the PSSCH in time slot n and time slot (n+1) correspond to PSFCH1 and PSFCH2 in time slot (n+1), respectively, and PSFCH1 and PSFCH2 have the same time domain and different frequency domains; for another example, in FIG. 5, the time-frequency resources used to send the PSSCH in time slot n, time slot (n+1) and time slot (n+2) respectively correspond to the PSFCH1, the PSFCH2 and the PSFCH3 in time slot (n+3), and the PSFCH1, the PSFCH2 and the PSFCH3 have the same time domain and different frequency domains. When the first UE is required to feed back to the second UE, the first UE combines and decodes the PSSCHs received on each of the L time-frequency resources in time sequence, and uses a final result of combining and decoding as feedback information to obtain the feedback information. The combining and decoding by the first UE will be described in detail below from the scenarios of unicast and groupcast.

When the above first method is used in a unicast scenario, FIG. 3 is taken as an example. After receiving the PSSCH in time slot n, the first UE decodes the PSSCH; if the decoding is successful, the decoding is terminated, that is, it is required to send ACK directly on PSFCH1 and PSFCH2, instead of decoding the PSSCH received in time slot (n+1); and if failing to decode the PSSCH in the slot n, the first UE combines and decodes both the PSSCH received in time slot n and the PSSCH received in time slot (n+1); if the combining and decoding are successful, ACK is sent on the PSFCH1 and the PSFCH2; and if the combining and decoding fail, NACK is sent on the PSFCH1 and the PSFCH2.

In the case the above first method is used in a groupcast scenario; if the first feedback method of the groupcast communication is adopted, that is, if the first UE decodes correctly, no feedback is sent; and if the first UE decodes incorrectly, NACK is sent to the second UE, and each of the first UEs in the groupcast group uses the same PSFCH resource. Taking FIG. 5 as an example, after receiving the PSSCH in time slot n, the first UE decodes the PSSCH; and if the decoding is successful, the decoding is terminated, that is, there is no need to decode the PSSCH received on slot (n+1) and the PSSCH received on slot (n+2), nor send ACK on PSFCH1, PSFCH2 and PSFCH3. If the first UE fails to decode the PSSCH in time slot n, the first UE combines and decodes the PSSCH received in time slot n and the PSSCH received in time slot (n+1). If the combining and decoding are successful, no ACK is sent, the decoding is terminated without sending ACK on PSFCH1, PSFCH2 and PSFCH3. If the combining and decoding fail, the PSSCHs received in time slot n, time slot (n+1) and time slot (n+2) are combined and decoded; if the combining and decoding are successful, no ACK is sent; and if the combining and decoding fail, NACK is sent on PSFCH1, PSFCH2 and PSFCH3.

When the above first method is used in a groupcast scenario; if the second feedback method of the groupcast communication is adopted, that is, if the Rx UE decodes correctly, ACK is sent to the Tx UE; if the Rx UE decodes incorrectly, NACK is sent to the Tx UE, and each of the Tx UEs in the groupcast group uses the independent PSFCH resource to send ACK or NACK to the Tx UE. Taking FIG. 3 as an example, after receiving the PSSCH in time slot n, the first UE decodes the PSSCH; if the decoding is successful, the decoding is terminated, that is, it is required to send ACK directly on PSFCH1, PSFCH2 and PSFCH3, instead of decoding the PSSCH received in time slot (n+1) and the PSSCH received on slot (n+2). If the first UE fails to decode the PSSCH in time slot n, the first UE combines and decodes the PSSCH received in time slot n and the PSSCH received in time slot (n+1); if the combining and decoding are successful, ACK is sent on PSFCH1, PSFCH2 and PSFCH3 and the decoding is terminated; and if the combining and decoding fail, the first UE combines and decodes the PSSCHs received in time slot n, time slot (n+1) and time slot (n+2), if the combining and decoding are successful, ACK is sent on PSFCH1, PSFCH2 and PSFCH3, and if the combining and decoding fail, NACK is sent on PSFCH1, PSFCH2 and PSFCH3.

The second method: the first UE sends feedback information to the second UE on the Lth one in the L PSFCH sub-resources.

In this method, the PSFCH resource at least includes L PSFCH sub-resources with the same time domain, and the L time-frequency resources respectively correspond to different PSFCH sub-resources in the L PSFCH sub-resources. When the first UE feeds back to the second UE according to the PSFCH resource and the received PSSCH, the first UE sends the feedback information to the second UE on the Lth one in the L PSFCH sub-resources, and the Lth PSFCH sub-resource is the PSFCH resource corresponds to the last time-frequency resource in the L time-frequency resources.

When the above second method is used in a unicast scenario, FIG. 3 is taken as an example. When L=N=2, the L time-frequency resources include time-frequency resources in time slot n and time-frequency resources in time slot (n+1), the Lth time-frequency resource is in time slot (n+1), and the PSFCH resource corresponding to the time-frequency resource in time slot (n+1) is PSFCH2. After receiving the PSSCH in time slot n, the first UE decodes the PSSCH; if the decoding is successful, the decoding is terminated, that is, it is required to send ACK directly on PSFCH2, instead of decoding the PSSCH received in time slot (n+1); and if failing to decode the PSSCH in slot n, the first UE combines and decodes both the PSSCH received in time slot n and the PSSCH received in time slot (n+1), if the combining and decoding are successful, ACK is sent on PSFCH2, and if the combining and decoding fail, NACK is sent on PSFCH2.

When the above second method is used in a groupcast scenario; if the first feedback method of the groupcast communication is adopted, FIG. 5 is taken as an example; when L=N=3, the L time-frequency resources include time-frequency resources in time slot n, time slot (n+1) and time slot (n+2). The Lth time-frequency resource is in time slot (n+2), and the PSFCH resource corresponding to the time-frequency resource in time slot (n+2) is PSFCH3. After receiving the PSSCH in time slot n, the first UE decodes the PSSCH; if the decoding is successful, the decoding is terminated, that is, there is no need to decode the PSSCH received on slot (n+1) and the PSSCH received on slot (n+2), nor send ACK on PSFCH3. If the first UE fails to decode the PSSCH in time slot n, the first UE combines and decodes the PSSCH received in time slot n and the PSSCH received in time slot (n+1). If the combining and decoding are successful, the decoding is terminated and no ACK is sent on PSFCH3. If the combining and decoding fail, the PSSCHs received in time slot n, time slot (n+1) and time slot (n+2) are combined and decoded; if the combining and decoding are successful, no ACK is sent; and if the combining and decoding fail, NACK is sent on PSFCH3. Where the combining and decoding are performed in sequence according to the receiving order of the PSSCHs. For example, after failing to decode the PSSCH received in time slot n, the first UE combines and decodes the PSSCHs received in slot n and slot (n+1); if the combining and decoding still fail, the PSSCHs received in time slot n, time slot (n+1) and time slot (n+2) are continued to be combined and decoded.

When the above second method is used in a groupcast scenario; if the second feedback method of the groupcast communication is adopted, FIG. 3 is taken as an example; when L=N=2, the L time-frequency resources include time-frequency resources in time slot n and time slot (n+1), the Lth time-frequency resource is in time slot (n+1), and the PSFCH resource corresponding to the time-frequency resource in time slot (n+1) is PSFCH2. After receiving the PSSCH in time slot n, the first UE decodes the PSSCH; if the decoding is successful, the decoding is terminated, that is, ACK is sent directly on PSFCH2 instead of decoding the PSSCH received in slot (n+1). If the first UE fails to decode the PSSCH in time slot n, the first UE combines and decodes the PSSCH received in time slot n and the PSSCH received in time slot (n+1); if the combining and decoding are successful, ACK is sent on PSFCH2; and if the combining and decoding fail, NACK is sent on PSFCH2.

The third method: the first UE sends the feedback information to the second UE on the Xth one in the L PSFCH sub-resources, where the Xth PSFCH sub-resource is a PSFCH resource corresponding to any one of the L time-frequency resources.

The difference between the third method and the second method lines in that: in the second method, the PSFCH resource used for sending the feedback information corresponds to the Lth one in the L time-frequency resources, while in the third method, the PSFCH resource used for sending the feedback information is any one of the PSFCH resources corresponding to the L time-frequency resources.

In another feasible implementation, when the first UE determines the L time-frequency resources according to the N time-frequency resources, after receiving the at least one first SCI, the first UE receives the second SCI from the second UE, where the second SCI is used to indicate one time-frequency resource, and the one time-frequency resource is used by the second UE to send the last PSSCH for blind retransmission. After that, the first UE determines the L time-frequency resources according to both the N time-frequency resources respectively indicated by the first SCIs and the time-frequency resource indicated by the second SCI, where the L time-frequency resources start are from a starting position of the N time-frequency resources indicated by the first SCI in the at least one first SCI to the time-frequency resource indicated by the second SCI.

Exemplarily, the second UE may indicate the first UE to perform blind retransmission and reception through the sidelink high-layer signaling, such as the PC5 RRC signaling, and indicate the first UE to feed back on the PSFCH resource corresponding to time-frequency resource of the last PSSCH for the blind retransmission. After the second UE receives multiple first SCIs and one second SCI, the L time-frequency resources are determined according to each of the first SCIs and the second SCI, and the L time-frequency resources may be continuous or discontinuous. Exemplarily, please refer to FIG. 7 and FIG. 8.

Figure 7:
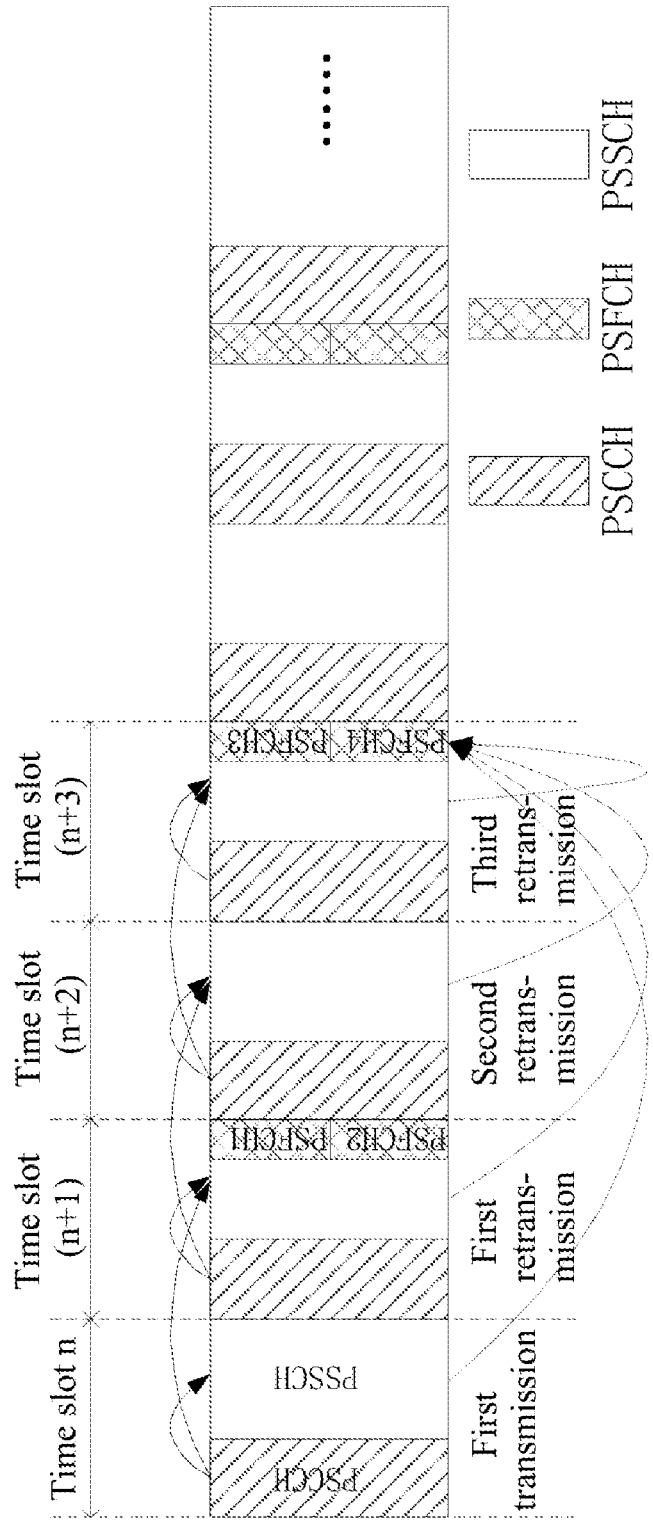
FIG. 7 is a corresponding relationship diagram between time-frequency resources and PSFCH resources in a feedback method provided by an embodiment of the present disclosure.

FIG. 7 is a corresponding relationship diagram between time-frequency resources and PSFCH resources in a feedback method provided by an embodiment of the present disclosure. It is assumed that the first UE determines that, through PC5 RRC signaling, feedback is only performed on the PSFCH resource corresponding to the time-frequency resource of the last PSSCH for the blind retransmission, and no feedback is sent during the blind retransmission. Referring to FIG. 7, N=2, and only the last one in every two sidelink time slots contains the PSFCH resource. The first UE receives the first SCI in time slot n, time slot (n+1), and time slot (n+2), and each first SCI indicates two time-frequency resources for sending the PSSCH; and the first UE receives the second SCI in time slot (n+3), and the second SCI indicates one time-frequency resource for sending the PSSCH. At this point, L=4, and the four time-frequency resources determined by the first UE according to three first SCIs and one second SCI include time-frequency resources corresponding to the PSSCH in time slot n, time slot (n+1), time slot (n+2) and time slot (n+3).

Figure 8:
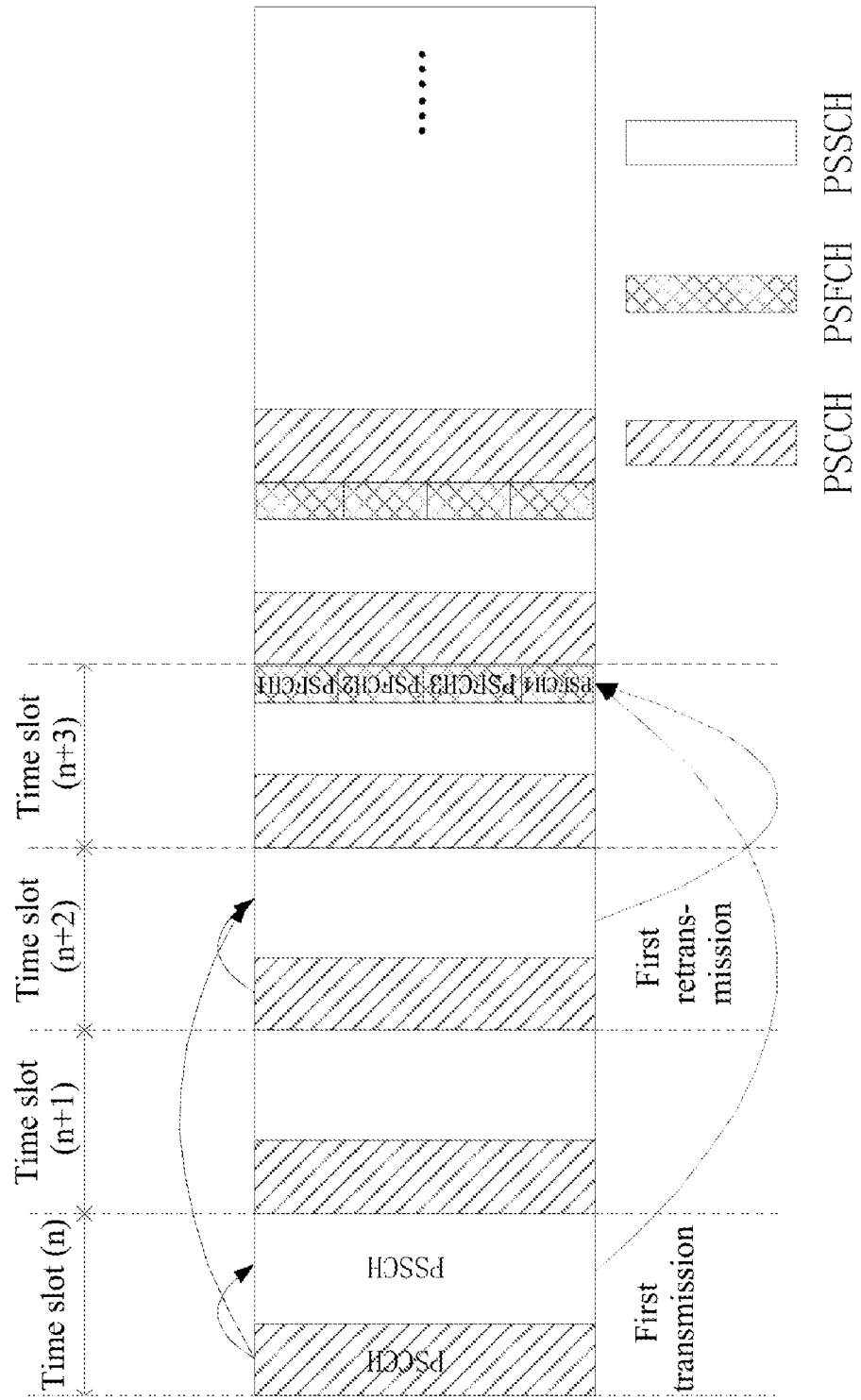
FIG. 8 is a corresponding relationship diagram between time-frequency resources and PSFCH resources in a feedback method provided by an embodiment of the present disclosure.

FIG. 8 is a corresponding relationship diagram between time-frequency resources and PSFCH resources in a feedback method provided by an embodiment of the present disclosure. It is assumed that the first UE determines that, through PC5 RRC signaling, feedback is only performed on the PSFCH resource corresponding to the time-frequency resource of the last PSSCH for the blind retransmission, and no feedback is sent during the blind retransmission. Referring to FIG. 8, N=2, and only the last one in every four sidelink time slots contains the PSFCH resource. The first UE receives the first SCI in time slot n, and the first SCI indicates two time-frequency resources for sending the PSSCH; and the first UE receives the second SCI in time slot (n+2), and the second SCI indicates one time-frequency resource for sending the PSSCH. At this point, L=2, and the two time-frequency resources determined by the first UE according to one first SCI and one second SCI include time-frequency resources corresponding to the PSSCH in time slot n and time slot (n+2).

For convenience, the time slot where the time-frequency resource of the last PSSCH for the above blind retransmission is located is referred to as the third time slot, which is, for example, time slot (n+3) in FIG. 7 and time slot (n+2) in FIG. 8. In the above embodiments, if there is a PSFCH resource in the third time slot, the first UE performs feedback according to the PSFCH resource; otherwise, the first UE is required to determine the PSFCH resource according to the third time slot. At this point, the first UE determines the first time slot corresponding to the third time slot according to the third time slot and the preconfigured time slot difference value K, so as to determine whether there is the PSFCH resource in the first time slot; if there is the PSFCH resource in the first time slot, the first UE determines the PSFCH resource according to the first time slot; and if there is a PSFCH resource in the first time slot, the first UE determines the second time slot, which is closest to the third time slot in the resource pool and contains the PSFCH resource, and the first UE feeds back to the second UE by using the PSFCH contained in the second time slot. Exemplarily, please see FIG. 9.

Figure 9:
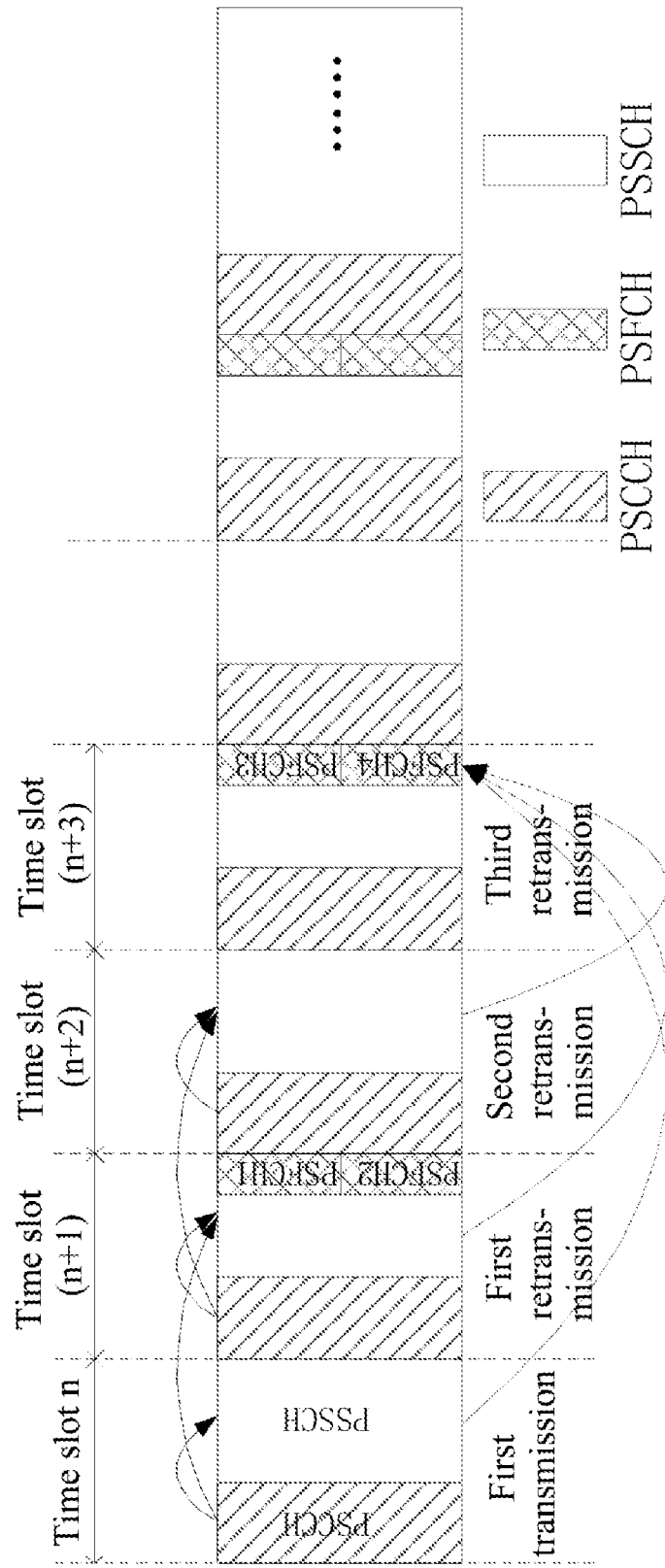
FIG. 9 is a corresponding relationship diagram between time-frequency resources and PSFCH resources in a feedback method provided by an embodiment of the present disclosure.

FIG. 9 is a corresponding relationship diagram between time-frequency resources and PSFCH resources in a feedback method provided by an embodiment of the present disclosure. Referring to FIG. 9, it is assumed that the first UE determines that, through PC5 RRC signaling, feedback is only performed on the PSFCH resource corresponding to the time-frequency resource of the last PSSCH for the blind retransmission, and no feedback is sent during the blind retransmission. Referring to FIG. 9, N=2, and only the last one in every two sidelink time slots contains the PSFCH resource. The first UE receives the first SCIs in time slot n and time slot (n+1), and each of the first SCIs indicates two time-frequency resources for sending the PSSCH, the first UE receives the second SCI on time slot (n+2), and the second SCI indicates one time-frequency resource for transmitting PSSCH. At this time, L=3, the three time-frequency resources determined by the first UE according to two first SCIs and one second SCI include time-frequency resources corresponding to the PSSCH in time slot n, time slot (n+1) and time slot (n+2). Since there is no PSFCH resource in the time slot (n+2), the first UE determines the first time slot according to the time slot (n+2) and the time slot difference K. When k=0, the first time slot is time slot (n+2). Since there is no PSFCH resource in time slot (n+2), the first UE determines the second time slot. The second time slot is a time slot in the resource pool which is closest to time slot (n+2) and contains PSFCH resources, and the time slot number thereof is greater than the time slot number of the first time slot. In FIG. 9, the second time slot is time slot (n+3). Then, the first UE feeds back to the second UE on the PSFCH resources contained in the time slot (n+3).

In the unicast scenario, FIG. 7 is taken as an example. After receiving the PSSCH in time slot n, the first UE decodes the PSSCH; if the decoding is successful, the subsequent decoding is terminated, and ACK is directly sent on PSFCH4; otherwise, combining and decoding are performed; finally, if the combining and decoding are successful, ACK is sent on the PSFCH4; and if the combining and decoding fail, NACK is sent on the PSFCH4.

In the groupcast scenario, when the first feedback method is adopted, FIG. 8 is taken as an example. After receiving the PSSCH in time slot n, the first UE decodes the PSSCH; and if the decoding is successful, the decoding is terminated, that is, there is no need to decode the PSSCH received in time slot (n+2), and no ACK is sent; and if the first UE fails to decode the PSSCH in time slot n, the first UE combines and decodes the PSSCH received in time slot n and time slot (n+2), if the combining and decoding are successful, no ACK is sent, and if the combining and decoding fail, NACK is sent on the PSFCH4.

In the groupcast scenario, when the second feedback method is adopted, FIG. 9 is taken as an example. After receiving the PSSCH in time slot n, the first UE decodes the PSSCH; if the decoding is successful, ACK is sent directly on the PSFCH4 instead of decoding the PSSCH received in slot(n+1), slot(n+2) and slot(n+3); if the first UE fails to decode the PSSCH in time slot n, the first UE combines and decodes, in time sequence, the PSSCHs received in time slot n, time slot (n+1), time slot (n+2) and time slot (n+3), and uses the result of combining and decoding as the feedback information, if the combining and decoding are successful, ACK is sent on the PSFCH4, and if the combining and decoding fail, NACK is sent on the PSFCH4.

The following are apparatus embodiments of the present disclosure, which can be used to perform method embodiments of the present disclosure. For details not disclosed in the apparatus embodiments of the present disclosure, please refer to the method embodiments of the present disclosure.

Figure 10:
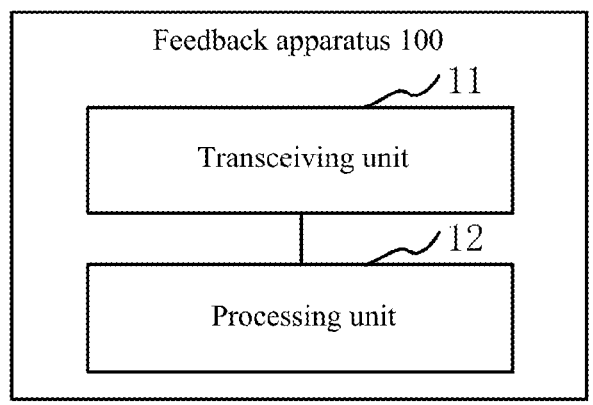
FIG. 10 is a schematic structural diagram of a feedback apparatus provided by an embodiment of the present disclosure.

FIG. 10 is a schematic structural diagram of a feedback apparatus provided by an embodiment of the present disclosure. The feedback apparatus 100 can be implemented by means of software and/or hardware. As shown in FIG. 10, the feedback determination apparatus 100 includes:

a transceiving unit 11, configured to receive first sidelink control information (SCI) from a second UE through a sidelink, where the first SCI is used to indicate N time-frequency resources, each of the N time-frequency resources is used by the second UE to send a physical sidelink shared channel (PSSCH), the PSSCH on each of the N time-frequency resources corresponds to a same transport block (TB), N≥2, and N is an integer;

a processing unit 12, configured to determine L time-frequency resources according to the N time-frequency resources, where time domains of physical sidelink feedback channel (PSFCH) resources corresponding to different time-frequency resources in the L time-frequency resources are the same; and feed back to the second UE according to a PSFCH resource and received PSSCH.

In a feasible design, the processing unit 12 is configured to determine, for each of the N time-frequency resources, a first time slot according to a time domain position of the time-frequency resource and a preconfigured time slot difference value K, so as to obtain N first time slots, where the time slot difference value K is used to indicate a minimum time domain interval between a time slot where the first UE receives the PSSCH sent by the second UE and a time slot where the first UE sends the PSFCH corresponding to the PSSCH; determine L first time slots from the N first time slots, where the L first time slots are continuous sidelink time slots, or the L first time slots are discontinuous sidelink time slots, and no PSFCH resource exists on an interval time slot between any two different first time slots in the L first time slots; and determine the L time-frequency resources according to the L first time slots.

In a feasible design, only a last first time slot of the L first time slots contains PSFCH resource.

In a feasible design, no PSFCH resource exists on each of the L first time slots; and after the determining the L time-frequency resources according to the L first time slots, the processing unit 12 is further configured to determine a second time slot, where the second time slot is located in a resource pool behind the last first time slot of the L first time slots, closest to the last first time slot of the L first time slots, and contains the PSFCH resource; and determine the PSFCH resource according to the second time slot.

In a feasible design, the PSFCH resource at least includes L PSFCH sub-resources with the same time domain, the L time-frequency resources respectively correspond to different PSFCH sub-resources in the L PSFCH sub-resources, and the transceiving unit 11 is further configured to send the feedback information to the second UE on each of the L PSFCH sub-resources.

In a feasible design, the PSFCH resource at least includes L PSFCH sub-resources with the same time domain, the L time-frequency resources respectively correspond to different PSFCH sub-resources in the L PSFCH sub-resources, and the transceiving unit 11 is further configured to send feedback information to the second UE on a Lth PSFCH sub-resource of the L PSFCH sub-resources, where the Lth PSFCH sub-resource is the PSFCH resource corresponding to a last time-frequency resource of the L time-frequency resources.

In a feasible design, the PSFCH resource at least includes L PSFCH sub-resources with the same time domain, the L time-frequency resources respectively correspond to different PSFCH sub-resources in the L PSFCH sub-resources, and the transceiving unit 11 sends feedback information to the second UE on a Xth PSFCH sub-resource of the L PSFCH sub-resources, where the Xth PSFCH sub-resource is the PSFCH resource corresponding to any one of the L time-frequency resources.

In a feasible design, a number of the first SCI is at least one, and after receiving at least one first SCI, the transceiving unit 11 receives second SCI from the second UE, where the second SCI is used to indicate one time-frequency resource which is a time-frequency resource used by the second UE to send a last PSSCH for blind retransmission; and the processing unit 12 is configured to determine the L time-frequency resources according to N time-frequency resources respectively indicated by each first SCI and a time-frequency resource indicated by the second SCI, where the L time-frequency resources are time-frequency resources which start from a starting position of the N time-frequency resources indicated by the first SCI in the at least one first SCI to a time-frequency resource indicated by the second SCI.

In a feasible design, before feeding back to the second UE according to the PSFCH resource and the received PSSCH, the processing unit 12 is further configured to determine a first time slot corresponding to a third time slot according to the third time slot and a preconfigured time slot difference K; and determine whether a PSFCH resource exists on the first time slot; if the PSFCH resource exists on the first time slot, the processing unit 12 determines the PSFCH resource according to the first time slot; and if the PSFCH resource does not exist on the first time slot, the processing unit 12 determines a second time slot, where the second time slot is located in a resource pool behind the first time slot, closest to the first time slot, and contains the PSFCH resource.

In a feasible design, before feeding back to the second UE according to the PSFCH resource and the received PSSCH, the processing unit 12 is further configured to combine and decode a PSSCH received on each of the L time-frequency resources in time sequence, and use a result of combining and decoding as feedback information to obtain the feedback information.

The feedback apparatus provided by the embodiments of the present disclosure may perform the action of the first UE in the foregoing embodiments, the implementation principles and technical effects thereof are similar, and will not be repeated herein.

It should be understood that the above transceiving unit may be a transceiver when actually implemented, and the processing unit may be implemented in the form of software calling through a processing element, or it can also be implemented in the form of hardware. For example, the processing unit may be a separately established processing element, or may be integrated in a certain chip of the above apparatus. In addition, it can also be stored in the memory of the above apparatus in the form of program code, and the function of the above processing unit is called and executed by a certain processing element of the above apparatus. Moreover, all or part of these units can be integrated together, and can also be implemented independently. The processing element described herein may be an integrated circuit with signal processing capability. In the implementation process, each step of the above method or each of the above units may be accomplished by the integrated logic circuit of the hardware in the processor element or by instructions in the form of software.

For example, the above units may be one or more integrated circuits configured to implement the above methods, for example, one or more application specific integrated circuits (ASIC), or one or more microprocessors (also known as Digital Signal Processor, DSP), or one or more field programmable gate arrays (FPGA), etc. For another example, when one of the above units is implemented in the form of processing element scheduler code, the processing element may be a general-purpose processor, for example, a central processing unit (CPU) or other processors that can invoke program code. For yet another example, these units can be integrated together and implemented in the form of system-on-a-chip (SOC).

Figure 11:
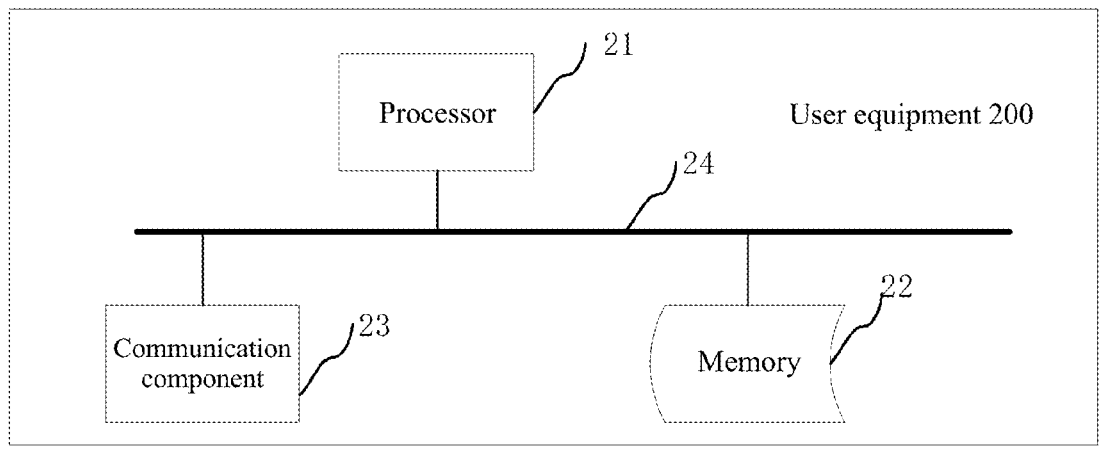
FIG. 11 is a schematic structural diagram of a user equipment provided by an embodiment of the present disclosure.

FIG. 11 is a schematic structural diagram of a user equipment provided by an embodiment of the present disclosure. As shown in FIG. 11, user equipment 200 includes:

processor 21 and memory 22;

the memory 22 stores computer-executed instructions; and the processor 21 executes the computer-executed instructions stored in the memory 22, so that the processor 21 perform the feedback method performed by the first UE as above.

For the specific implementation process of the processor 21, please refer to the above method embodiments, and the implementation principles and technical effects thereof are similar, which will not be repeated herein.

In an implementation, UE 200 further includes a communication component 23, where the processor 21, the memory 22 and the communication component 23 can be connected through a bus 24.

An embodiment of the present disclosure further provides a storage medium having stored thereon computer-executed instructions which, when executed by the processor, implements the feedback method performed by the first UE as above.

An embodiment of the present disclosure further provides a computer program product which, when running on the first UE, implements the feedback method executed by the first UE.

Those of ordinary skill in the art can understand that all or part of the steps for implementing the above method embodiments may be completed by program instructions related hardware. The foregoing program can be stored in a computer-readable storage medium. When the program is executed, the steps including the above method embodiments are performed; and the foregoing storage medium includes various media that can store program codes, such as a read only memory (ROM), a random access memory (RAM), a magnetic disk, or an optical disk.

Embodiments of the present disclosure provide a feedback method and apparatus, in which, when SCI indicates time-frequency resource for N times of data transmission for the same TB, a Rx UE determines L time-frequency resources according to N time-frequency resources, and time domains of the PSFCH resources corresponding to each of the L time-frequency resources are the same. Feedback on the PSFCH resource to a Tx UE improves the transmission reliability. And the present disclosure can also reduce the number of PSFCHs sent at the same time and reduce PSFCH collisions.

In a first aspect, an embodiment of the present disclosure provides a feedback method, including:

receiving, by a first user equipment (UE), first sidelink control information (SCI) from a second UE through a sidelink, where the first SCI is used to indicate N time-frequency resources, each of the N time-frequency resources is used by the second UE to send a physical sidelink shared channel (PSSCH), the PSSCH on each of the N time-frequency resources corresponds to a same transport block (TB), N≥2, and N is an integer;

determining, by the first UE, L time-frequency resources according to the N time-frequency resources, where time domains of physical sidelink feedback channel (PSFCH) resources corresponding to different time-frequency resources in the L time-frequency resources are the same; and feeding back, by the first UE, to the second UE according to a PSFCH resource and received PSSCH.

In a feasible design, the determining, by the first UE, the L time-frequency resources according to the N time-frequency resources includes:

for each of the N time-frequency resources, determining, by the first UE, a first time slot according to a time domain position of the time-frequency resource and a preconfigured time slot difference value K, so as to obtain N first time slots, where the time slot difference value K is used to indicate a minimum time domain interval between a time slot where the first UE receives the PSSCH sent by the second UE and a time slot where the first UE sends the PSFCH corresponding to the PSSCH;

determining, by the first UE, L first time slots from the N first time slots, where the L first time slots are continuous sidelink time slots; or the L first time slots are discontinuous sidelink time slots, and no PSFCH resource exists on an interval time slot between any two different first time slots in the L first time slots; and determining, by the first UE, the L time-frequency resources according to the L first time slots.

In a feasible design, only a last first time slot of the L first time slots contains the PSFCH resource.

In a feasible design, no PSFCH resource exists on each of the L first time slots; and after determining, by the first UE, the L time-frequency resources according to the L first time slots, the method further includes:

determining, by the first UE, a second time slot, where the second time slot is located in a resource pool behind the last first time slot of the L first time slots, closest to the last first time slot of the L first time slots, and contains the PSFCH resource; and determining, by the first UE, the PSFCH resource according to the second time slot.

In a feasible design, the PSFCH resource at least includes L PSFCH sub-resources with the same time domain, the L time-frequency resources respectively correspond to different PSFCH sub-resources in the L PSFCH sub-resources, and the feeding back, by the first UE, to the second UE according to the PSFCH resource and the received PSSCH includes:

sending, by the first UE, feedback information to the second UE on each of the L PSFCH sub-resources.

In a feasible design, the PSFCH resource at least includes L PSFCH sub-resources with the same time domain, the L time-frequency resources respectively correspond to different PSFCH sub-resources in the L PSFCH sub-resources, and the feeding back, by the first UE, to the second UE according to the PSFCH resource and the received PSSCH includes:

sending, by the first UE, feedback information to the second UE on a Lth PSFCH sub-resource of the L PSFCH sub-resources, where the Lth PSFCH sub-resource is the PSFCH resource corresponding to a last time-frequency resource of the L time-frequency resources.

In a feasible design, the PSFCH resource at least includes L PSFCH sub-resources with the same time domain, the L time-frequency resources respectively correspond to different PSFCH sub-resources in the L PSFCH sub-resources, and the feeding back, by the first UE, to the second UE according to the PSFCH resource and the received PSSCH includes:

sending, by the first UE, feedback information to the second UE on a Xth PSFCH sub-resource of the L PSFCH sub-resources, where the Xth PSFCH sub-resource is the PSFCH resource corresponding to any one of the L time-frequency resources.

In a feasible design, a number of the first SCI is at least one, and the determining, by the first UE, the L time-frequency resources according to the N time-frequency resources includes:

after receiving at least one first SCI, receiving, by the first UE, second SCI from the second UE, where the second SCI is used to indicate one time-frequency resource which is a time-frequency resource used by the second UE to send a last PSSCH for blind retransmission; and determining, by the first UE, the L time-frequency resources according to N time-frequency resources respectively indicated by each first SCI and a time-frequency resource indicated by the second SCI, where the L time-frequency resources are time-frequency resources which start from a starting position of the N time-frequency resources indicated by the first SCI in the at least one first SCI to a time-frequency resource indicated by the second SCI.

In a feasible design, before feeding back, by the first UE, to the second UE according to the PSFCH resource and the received PSSCH, the method further including:

determining, by the first UE, a first time slot corresponding to a third time slot according to the third time slot and a preconfigured time slot difference K; and determining, by the first UE, whether a PSFCH resource exists on the first time slot; if the PSFCH resource exists on the first time slot, the first UE determines the PSFCH resource according to the first time slot; and if the PSFCH resource does not exist on the first time slot, the first UE determines a second time slot, where the second time slot is located in a resource pool behind the first time slot, closest to the first time slot, and contains the PSFCH resource.

In a feasible design, before feeding back, by the first UE, to the second UE according to the PSFCH resource and the received PSSCH, the method further including:

combining and decoding, by the first UE, a PSSCH received on each of the L time-frequency resources in time sequence, and using a result of combining and decoding as feedback information to obtain the feedback information.

In a second aspect, an embodiment of the present disclosure provides a feedback apparatus, including:

a transceiving unit, configured to receive first sidelink control information (SCI) from a second UE through a sidelink, where the first SCI is used to indicate N time-frequency resources, each of the N time-frequency resources is used by the second UE to send a physical sidelink shared channel (PSSCH), the PSSCH on each of the N time-frequency resources corresponds to a same transport block (TB), N≥2, and N is an integer; and a processing unit, configured to determine L time-frequency resources according to the N time-frequency resources, where time domains of physical sidelink feedback channel (PSFCH) resources corresponding to different time-frequency resources in the L time-frequency resources are the same; and feed back to the second UE according to a PSFCH resource and received PSSCH.

In a feasible design, the processing unit is configured to, for each of the N time-frequency resources, a first time slot according to a time domain position of the time-frequency resource and a preconfigured time slot difference value K, so as to obtain N first time slots, where the time slot difference value K is used to indicate a minimum time domain interval between a time slot where the first UE receives the PSSCH sent by the second UE and a time slot where the first UE sends the PSFCH corresponding to the PSSCH; determine L first time slots from the N first time slots, where the L first time slots are continuous sidelink time slots, or the L first time slots are discontinuous sidelink time slots, and no PSFCH resource exists on an interval time slot between any two different first time slots in the L first time slots; and determine the L time-frequency resources according to the L first time slots.

In a feasible design, only a last first time slot of the L first time slots contains the PSFCH resource.

In a feasible design, no PSFCH resource exists on each of the L first time slots; and after the determining the L time-frequency resources according to the L first time slots, the processing unit is further configured to determine a second time slot, where the second time slot is located in a resource pool behind the last first time slot of the L first time slots, closest to the last first time slot of the L first time slots, and contains the PSFCH resource; and determine the PSFCH resource according to the second time slot.

In a feasible design, the PSFCH resource at least includes L PSFCH sub-resources with the same time domain, the L time-frequency resources respectively correspond to different PSFCH sub-resources in the L PSFCH sub-resources, and the transceiving unit is further configured to send feedback information to the second UE on each of the L PSFCH sub-resources.

In a feasible design, the PSFCH resource at least includes L PSFCH sub-resources with the same time domain, the L time-frequency resources respectively correspond to different PSFCH sub-resources in the L PSFCH sub-resources, and the transceiving unit is further configured to send feedback information to the second UE on a Lth PSFCH sub-resource of the L PSFCH sub-resources, where the Lth PSFCH sub-resource is the PSFCH resource corresponding to a last time-frequency resource of the L time-frequency resources.

In a feasible design, the PSFCH resource at least includes L PSFCH sub-resources with the same time domain, the L time-frequency resources respectively correspond to different PSFCH sub-resources in the L PSFCH sub-resources, and the transceiving unit is further configured to send feedback information to the second UE on a Xth PSFCH sub-resource of the L PSFCH sub-resources, where the Xth PSFCH sub-resource is the PSFCH resource corresponding to any one of the L time-frequency resources.

In a feasible design, a number of the first SCI is at least one, and after receiving at least one first SCI, the transceiving unit receives second SCI from the second UE, where the second SCI is used to indicate one time-frequency resource which is a time-frequency resource used by the second UE to send ta last PSSCH for blind retransmission; and the processing unit is configured to determine the L time-frequency resources according to N time-frequency resources respectively indicated by each first SCI and a time-frequency resource indicated by the second SCI, where the L time-frequency resources are time-frequency resources which start from a starting position of the N time-frequency resources indicated by the first SCI in the at least one first SCI to a time-frequency resource indicated by the second SCI.

In a feasible design, before feeding back to the second UE according to the PSFCH resource and the received PSSCH, the processing unit is further configured to determine a first time slot corresponding to a third time slot according to the third time slot and a preconfigured time slot difference K; and determine whether a PSFCH resource exists on the first time slot; if the PSFCH resource exists on the first time slot, the processing unit determines the PSFCH resource according to the first time slot; and if the PSFCH resource does not exist on the first time slot, the processing unit determines a second time slot, where the second time slot is located in a resource pool behind the first time slot, closest to the first time slot, and contains the PSFCH resource.

In a feasible design, before feeding back to the second UE according to the PSFCH resource and the received PSSCH, the processing unit is further configured to combine and decode a PSSCH received on each of the L time-frequency resources in time sequence, and use a result of combining and decoding as feedback information to obtain the feedback information.

In a third aspect, an embodiment of the present disclosure provides a user equipment, including a processor, a memory, and a computer program stored in the memory and executable on the processor, and when the processor executes the program, the method according to various possible implementations of the first aspect or to the first aspect as such is implemented.

In a fourth aspect, an embodiment of the present disclosure provides a computer program product including instructions which, when running on a UE, cause the computer of the UE to perform the method according to various possible implementations of the first aspect or to the first aspect as such.

In a fifth aspect, an embodiment of the present disclosure provides a storage medium having stored therein instructions which, when running on a UE, cause the UE to perform the method according to various possible implementations of the first aspect or to the first aspect as such.

In the feedback method and apparatus provided by the embodiments of the present disclosure, the SCI sent by the second UE to the first UE is used to indicate N time-frequency resources, the second UE sends a PSSCH to the first UE on each of the N time-frequency resources, the N PSSCHs correspond to the same TB, the first UE determines L time-frequency resources according to the N time-frequency resources indicated by the first SCI, and time domains of PSFCH resources respectively corresponding to the L time-frequency resources are the same. Afterwards, the first UE feeds back to the second UE according to the PSFCH resource and received PSSCH. By using the solution, when the first SCI indicates the time-frequency resources for N times of data transmission for the same TB, the Rx UE determines the L time-frequency resources according to the N time-frequency resources, and the time domains of the PSFCH resources corresponding to each of the L time-frequency resources are the same. After that, feedback is sent to the Tx UE on the PSFCH resources with the same time domain, which improves the transmission reliability.

Finally, it should be noted that the above embodiments are merely for illustrating, instead of limiting the technical solutions of the present disclosure. Although the present disclosure has been illustrated in detail with reference to the foregoing embodiments, a person ordinarily skill in the art should understand: the technical solution described in the foregoing embodiments may also be modified or equivalently substituted for some or all of the technical features; and the modifications and substitutions should do not cause the essence of the corresponding technical solutions to depart from the scope of the technical solutions of the embodiments of the present disclosure.

What is claimed is:

1. A feedback method, comprising:
   receiving, by a first user equipment (UE), first sidelink control information (SCI) from a second UE through a sidelink, wherein the first SCI is used to indicate N time-frequency resources, each of the N time-frequency resources is used by the second UE to send a physical sidelink shared channel (PSSCH), the PSSCH on each of the N time-frequency resources corresponds to a same transport block (TB), N≥2, and N is an integer;
   determining, by the first UE, L time-frequency resources according to the N time-frequency resources, wherein time domains of physical sidelink feedback channel (PSFCH) resources corresponding to different time-frequency resources in the L time-frequency resources are the same; and
   feeding back, by the first UE, to the second UE according to a PSFCH resource and received PSSCH;
   wherein the determining, by the first UE, the L time-frequency resources according to the N time-frequency resources comprises:
   for each of the N time-frequency resources, determining, by the first UE, a first time slot according to a time domain position of the time-frequency resource and a preconfigured time slot difference value K, so as to obtain N first time slots, wherein the time slot difference value K is used to indicate a minimum time domain interval between a time slot where the first UE receives the PSSCH sent by the second UE and a time slot where the first UE sends the PSFCH corresponding to the PSSCH;
   determining, by the first UE, L first time slots from the N first time slots, wherein the L first time slots are continuous sidelink time slots; or the L first time slots are discontinuous sidelink time slots, and no PSFCH resource exists on an interval time slot between any two different first time slots in the L first time slots; and
   determining, by the first UE, the L time-frequency resources according to the L first time slots.

2. The method according to claim 1, wherein only a last first time slot of the L first time slots contains the PSFCH resource.

3. The method according to claim 1, wherein no PSFCH resource exists on each of the L first time slots; and after determining, by the first UE, the L time-frequency resources according to the L first time slots, the method further comprises:
   determining, by the first UE, a second time slot, wherein the second time slot is located in a resource pool behind the last first time slot of the L first time slots, closest to the last first time slot of the L first time slots, and contains the PSFCH resource; and
   determining, by the first UE, the PSFCH resource according to the second time slot.

4. The method according to claim 1, wherein the PSFCH resource at least comprises L PSFCH sub-resources with the same time domain, the L time-frequency resources respectively correspond to different PSFCH sub-resources in the L PSFCH sub-resources, and the feeding back, by the first UE, to the second UE according to the PSFCH resource and the received PSSCH comprises:
   sending, by the first UE, feedback information to the second UE on each of the L PSFCH sub-resources.

5. The method according to claim 1, wherein the PSFCH resource at least comprises L PSFCH sub-resources with the same time domain, the L time-frequency resources respectively correspond to different PSFCH sub-resources in the L PSFCH sub-resources, and the feeding back, by the first UE, to the second UE according to the PSFCH resource and the received PSSCH comprises:
   sending, by the first UE, feedback information to the second UE on a Lth PSFCH sub-resource of the L PSFCH sub-resources, wherein the Lth PSFCH sub-resource is the PSFCH resource corresponding to a last time-frequency resource of the L time-frequency resources.

6. The method according to claim 1, wherein the PSFCH resource at least comprises L PSFCH sub-resources with the same time domain, the L time-frequency resources respectively correspond to different PSFCH sub-resources in the L PSFCH sub-resources, and the feeding back, by the first UE, to the second UE according to the PSFCH resource and the received PSSCH comprises:
   sending, by the first UE, feedback information to the second UE on a Xth PSFCH sub-resource of the L PSFCH sub-resources, wherein the Xth PSFCH sub-resource is the PSFCH resource corresponding to any one of the L time-frequency resources.

7. The method according to claim 1, wherein a number of the first SCI is at least one, and the determining, by the first UE, the L time-frequency resources according to the N time-frequency resources comprises:
after receiving at least one first SCI, receiving, by the first UE, second SCI from the second UE, wherein the second SCI is used to indicate one time-frequency resource which is a time-frequency resource used by the second UE to send a last PSSCH for blind retransmission; and
determining, by the first UE, the L time-frequency resources according to N time-frequency resources respectively indicated by each first SCI and a time-frequency resource indicated by the second SCI, wherein the L time-frequency resources are time-frequency resources which start from a starting position of the N time-frequency resources indicated by the first SCI in the at least one first SCI to a time-frequency resource indicated by the second SCI.

8. The method according to claim 7, before feeding back, by the first UE, to the second UE according to the PSFCH resource and the received PSSCH, further comprising:
determining, by the first UE, a first time slot corresponding to a third time slot according to the third time slot and a preconfigured time slot difference K; and
determining, by the first UE, whether a PSFCH resource exists on the first time slot; if the PSFCH resource exists on the first time slot, the first UE determines the PSFCH resource according to the first time slot; and if the PSFCH resource does not exist on the first time slot, the first UE determines a second time slot, wherein the second time slot is located in a resource pool behind the first time slot, closest to the first time slot, and contains the PSFCH resource.

9. The method according to claim 1, before feeding back, by the first UE, to the second UE according to the PSFCH resource and the received PSSCH, further comprising:
combining and decoding, by the first UE, a PSSCH received on each of the L time-frequency resources in time sequence, and using a result of combining and decoding as feedback information to obtain the feedback information.

10. A feedback apparatus, comprising:
a processor, a memory and a computer program;
a communication interface connected with the processor; and
wherein the computer program is stored in the memory and configured to be executed by the processor to cause the processor to:
receive, through the communication interface, first sidelink control information (SCI) from a second UE through a sidelink, wherein the first SCI is used to indicate N time-frequency resources, each of the N time-frequency resources is used by the second UE to send a physical sidelink shared channel (PSSCH), the PSSCH on each of the N time-frequency resources corresponds to a same transport block (TB), N≥2, and N is an integer; and
determine L time-frequency resources according to the N time-frequency resources, wherein time domains of physical sidelink feedback channel (PSFCH) resources corresponding to different time-frequency resources in the L time-frequency resources are the same; and feed back to the second UE according to a PSFCH resource and received PSSCH;
wherein the processor is further caused to:
determine, for each of the N time-frequency resources, a first time slot according to a time domain position of the time-frequency resource and a preconfigured time slot difference value K, so as to obtain N first time slots, wherein the time slot difference value K is used to indicate a minimum time domain interval between a time slot where the first UE receives the PSSCH sent by the second UE and a time slot where the first UE sends the PSFCH corresponding to the PSSCH; determine L first time slots from the N first time slots, wherein the L first time slots are continuous sidelink time slots, or the L first time slots are discontinuous sidelink time slots, and no PSFCH resource exists on an interval time slot between any two different first time slots in the L first time slots; and determine the L time-frequency resources according to the L first time slots.

11. The apparatus according to claim 10, wherein no PSFCH resource exists on each of the L first time slots; and after the determining the L time-frequency resources according to the L first time slots, the processor is further caused to: determine a second time slot, wherein the second time slot is located in a resource pool behind the last first time slot of the L first time slots, closest to the last first time slot of the L first time slots, and contains the PSFCH resource; and determine the PSFCH resource according to the second time slot.

12. The apparatus according to claim 10, wherein the PSFCH resource at least comprises L PSFCH sub-resources with the same time domain, the L time-frequency resources respectively correspond to different PSFCH sub-resources in the L PSFCH sub-resources, and the processor is further caused to: send, through the communication interface, feedback information to the second UE on each of the L PSFCH sub-resources.

13. The apparatus according to claim 10, wherein the PSFCH resource at least comprises L PSFCH sub-resources with the same time domain, the L time-frequency resources respectively correspond to different PSFCH sub-resources in the L PSFCH sub-resources, and the processor is further caused to: send, through the communication interface, feedback information to the second UE on a Lth PSFCH sub-resource of the L PSFCH sub-resources, wherein the Lth PSFCH sub-resource is the PSFCH resource corresponding to a last time-frequency resource of the L time-frequency resources.

14. The apparatus according to claim 10, wherein the PSFCH resource at least comprises L PSFCH sub-resources with the same time domain, the L time-frequency resources respectively correspond to different PSFCH sub-resources in the L PSFCH sub-resources, and the processor is further caused to: send, through the communication interface, feedback information to the second UE on a Xth PSFCH sub-resource of the L PSFCH sub-resources, wherein the Xth PSFCH sub-resource is the PSFCH resource corresponding to any one of the L time-frequency resources.

15. The apparatus according to claim 10, wherein a number of the first SCI is at least one, and after receiving at least one first SCI, the processor is further caused to: receive, through the communication interface, second SCI from the second UE, wherein the second SCI is used to indicate one time-frequency resource which is a time-frequency resource used by the second UE to send a last PSSCH for blind retransmission; and the processor is further caused to: determine the L time-frequency resources according to N time-frequency resources respectively indicated by each first SCI and a time-frequency resource indicated by the second SCI, wherein the L time-frequency resources are time-frequency resources which start from a starting position of the N time-frequency resources indicated by the first SCI in the at least one first SCI to a time-frequency resource indicated by the second SCI.

16. The apparatus according to claim 15, wherein, before feeding back to the second UE according to the PSFCH resource and the received PSSCH, the processor is further caused to: determine a first time slot corresponding to a third time slot according to the third time slot and a preconfigured time slot difference K; and determine whether a PSFCH resource exists on the first time slot; if the PSFCH resource exists on the first time slot, the processor is further caused to: determine the PSFCH resource according to the first time slot; and if the PSFCH resource does not exist on the first time slot, the processor is further caused to: determine a second time slot, wherein the second time slot is located in a resource pool behind the first time slot, closest to the first time slot, and contains the PSFCH resource.

17. The apparatus according to claim 10, before feeding back to the second UE according to the PSFCH resource and the received PSSCH, the processor is further caused to:
combine and decode a PSSCH received on each of the L time-frequency resources in time sequence, and use a result of combining and decoding as feedback information to obtain the feedback information.

18. A non-transitory computer readable storage medium, wherein the storage medium has stored therein instructions which, when running on a user equipment, cause the user equipment to perform the following steps:
receiving, by a first user equipment (UE), first sidelink control information (SCI) from a second UE through a sidelink, wherein the first SCI is used to indicate N time-frequency resources, each of the N time-frequency resources is used by the second UE to send a physical sidelink shared channel (PSSCH), the PSSCH on each of the N time-frequency resources corresponds to a same transport block (TB), N≥2, and N is an integer;

determining, by the first UE, L time-frequency resources according to the N time-frequency resources, wherein time domains of physical sidelink feedback channel (PSFCH) resources corresponding to different time-frequency resources in the L time-frequency resources are the same; and feeding back, by the first UE, to the second UE according to a PSFCH resource and received PSSCH;

wherein the determining, by the first UE, the L time-frequency resources according to the N time-frequency resources comprises:

for each of the N time-frequency resources, determining, by the first UE, a first time slot according to a time domain position of the time-frequency resource and a preconfigured time slot difference value K, so as to obtain N first time slots, wherein the time slot difference value K is used to indicate a minimum time domain interval between a time slot where the first UE receives the PSSCH sent by the second UE and a time slot where the first UE sends the PSFCH corresponding to the PSSCH;

determining, by the first UE, L first time slots from the N first time slots, wherein the L first time slots are continuous sidelink time slots; or the L first time slots are discontinuous sidelink time slots, and no PSFCH resource exists on an interval time slot between any two different first time slots in the L first time slots; and determining, by the first UE, the L time-frequency resources according to the L first time slots.

* * * * *